United States Patent [19]

Falkner

[11] Patent Number: 4,505,163

[45] Date of Patent: Mar. 19, 1985

[54] MECHANISM WITH CONTINUOUS ADJUSTMENT FOR THE TRANSMISSION OF A ROTARY MOTION BETWEEN TWO COAXIAL SHAFTS

[76] Inventor: Raimund Falkner, A6426 Roppen Nr. 64, Austria

[21] Appl. No.: 346,081

[22] PCT Filed: May 21, 1981

[86] PCT No.: PCT/AT81/00011

§ 371 Date: Jan. 21, 1982

§ 102(e) Date: Jan. 21, 1982

[87] PCT Pub. No.: WO81/03367

PCT Pub. Date: Nov. 26, 1981

[30] Foreign Application Priority Data

May 23, 1980 [AT] Austria ............... PCT/AT80/00016

[51] Int. Cl.³ .................. F16H 21/12; F16H 21/48; F16H 25/08; F16H 15/00
[52] U.S. Cl. ............................. 74/63; 74/190; 74/199; 74/211; 74/793; 74/804
[58] Field of Search ............... 74/63, 190, 194, 199, 74/200, 201, 793, 394, 804, 805, 211

[56] References Cited

U.S. PATENT DOCUMENTS

| | | | |
|---|---|---|---|
| 546,249 | 9/1895 | Regan | 74/785 |
| 755,616 | 3/1904 | Cheyne | 74/199 |
| 2,066,758 | 1/1937 | Bassoff | 74/793 |
| 2,068,784 | 1/1937 | Abbott | 474/21 |
| 3,020,782 | 2/1962 | Sacchi | 74/190 |
| 3,082,634 | 3/1963 | Battistin | 74/199 |
| 3,190,148 | 6/1965 | Flichy | 74/804 |
| 3,396,591 | 8/1968 | Schorp | 474/201 |
| 3,420,113 | 1/1969 | Tauscher | 74/63 |
| 3,765,257 | 10/1973 | Ogino | 74/190 |
| 4,047,443 | 9/1977 | Leveque | 74/199 |
| 4,311,061 | 1/1982 | Battistin | 74/199 |

FOREIGN PATENT DOCUMENTS

| | | | |
|---|---|---|---|
| 222966 | 3/1962 | Austria . | |
| 820087 | 11/1937 | France | 74/793 |
| 1332135 | 12/1963 | France . | |

Primary Examiner—Lawrence J. Staab
Assistant Examiner—Michael D. Bednarek
Attorney, Agent, or Firm—Kuhn, Muller and Bazerman

[57] ABSTRACT

A hub (2) is rigidly torsionwise attached to a leading shaft (1) but free to move axially and radially. A rotary plate (3) is arranged on said hub (2) through a ball bearing (21) and carries a ring (4) provided with four conical transmission surfaces (30, 31). The transmission surfaces (30) of the ring (4) run on surfaces (33) of two rims (7, 8) of a wheel (6) integral with the casing, and the transmission surfaces (31) run on surfaces (34) of two rims (10, 11) of a second wheel (9) attached to the driven shaft (12) and coaxial with the wheel (6). The distance between the rims (7, 8 and 10, 11) is adjustable. When the driving shaft (1) rotates, the ring (4) effects a slow oscillation motion about the leading shaft (1) and transmits such motion to the wheel (9). The two transmission ranges are offset by 180°. The eccentricity is adjustable between a maximum and zero, which allows the obtention of a reduction up to the infinite. A toothing may be provided in the transmission areas. As toothing elements, the ring (4) may be provided with sets of axially free disks and arranged on two rims, which mesh with grooves (71) provided in the surfaces (33, 34). Adjustment devices, preferably in the form of a unit assembly, are used for adjusting the rims (8, 11) and the hub (2).

13 Claims, 12 Drawing Figures

MECHANISM WITH CONTINUOUS ADJUSTMENT FOR THE TRANSMISSION OF A ROTARY MOTION BETWEEN TWO COAXIAL SHAFTS

The invention relates to a mechanism with continuous adjustment for the transmission of a rotary motion between an input shaft and a coaxial output shaft comprising a first concentric wheel integral with the casing and having two first wheel rims with first conical transmission surfaces, the axial distance between said two rims being adjustable, further comprising a ring with conical surfaces running on said first transmission surfaces, said ring being rotatably mounted on a hub adapted to move with the input shaft and radially displaceable, and further comprising a second wheel concentrically arranged on the output shaft, said second wheel having second wheel rims with second conical transmission surfaces, the axial distance of said second rims being adjustable.

CHARACTERISTIC OF THE KNOWN PRIOR ART

A mechanism of this kind in the form of a friction wheel mechanism has been described in an embodiment of the FR-PS No. 1 332 135. Herein, power is transmitted from the ring onto the wheel arranged on the output shaft by means of double conical disks as intermediate members adjustably spaced from one another, said intermediate members alternately coacting with the conical surfaces of the ring, on the one hand, and with the conical transmission surfaces of the second wheel, on the other hand. The radial adjustment of the hub is effected by means of an eccentric movable in the input shaft designed as a hollow shaft, a clutch being provided between the input shaft and the driving member. Further, the two wheel rims of each concentric wheel are acted upon by pressure springs so that the contact pressure between the transmission surfaces is limited and great torques are not transmissible. Because of the great number of gear members and conical surfaces, the structure of the prior art mechanism is very complicated.

A similar mechanism has also been described in the AT-PS No. 222.966. The reduction ratio therof is continuously and precisely adjustable to the infinite but this mechanism, too, has constructional deficiencies in respect of the transmission of the rotary motion between the radially adjustable and, hence, eccentrically adjustable friction ring and the output shaft, said motion being effected by means of a wobbling bell-shaped coupling member as output member. Only at an infinite reduction ratio runs the wobbling bell-shaped coupling member concentrically with the output shaft, but makes a wobbling motion at any other position, whereby a double cardan joint with the friction ring and the output shaft is obtained. The radial adjustment of the friction ring towards the input shaft is forced by the approach of the two friction rims of the friction wheel integral with the casing, away from the input shaft, however, by means of a spring biased between the input shaft and the hub. In this case, it has also been found that in the transmission of particularly great torques, the spring inserted between the input shaft and the hub is not able to exert the required contact pressure between the friction ring and the friction wheel, particularly when irregular loads occur.

OBJECT OF THE INVENTION

It is the object of the invention to improve and simplify a mechanism of the above-mentioned kind in its working part. Moreover, in a preferred embodiment, a forced displacement of the wheel rims and the hub of the ring in both directions shall be obtained in order to be able to transmit also particularly great torques.

DESCRIPTION OF THE CHARACTER OF THE INVENTION

According to the invention, this is achieved by adapting the ring to also run on the second conical transmission surfaces, the transmission ranges between the ring and the first wheel integral with the casing as well as the second wheel rotatable with the output shaft being offset by 180°.

The offset arrangement of the transmittion regions by 180° has already been known from toothed gearings with eccentric double-toothed intermediate member, e.g. from the U.S. patent Ser. No. 546.249.

The eccentrically adjustable ring is now on the one hand, according to the AT-PS No. 222.966, with its outwardly directed transmission surface pressed into the first concentric wheel integral with the casing, on the other hand, due to the solution according to the invention, with its inwardly directed transmission surface forced into the second wheel which is also concentric and linked to the output shaft. The transmission of the rotary motion between the radially and, hence, eccentrically moving ring and the second concentric wheel is thereby direct without intermediate member. As preferably one wheel rim, each, of the two concentric wheels is undisplaceable in axial direction and, therefore, an axial adjustment of the ring is simultaneously required with its radial displacement because of the conical surfaces, it is particularly provided that the ring is arranged on the hub to be axially displaceable. It is, however, also possible to link the hub to the ring to be axially undisplaceable and to provide, instead, the possibility of axially displacing the hub in respect of the input shaft. The change in the axial distances of the wheel rims of the second wheel is obtained by its being axially coupled to the first external wheel, whereby it is preferably provided that one wheel rim, each, of the two wheels is axially undisplaceable and that their other wheel rims are axially displaceable by means of a common first adjustment device having a first adjustment ring movable on a thread integral with the casing, said ring axially acting upon the displaceable wheel rim of the first wheel integral with the casing by means of intermediate members, a rolling bearing being arranged between the two displaceable wheel rims of the two wheels.

For the forces radial adjustment of the hub in both directions, i.e. for altering its eccentricity, an ambodiment further provides that a second adjustment device is associated with the hub of the ring, said device having a second adjustment ring movable on a thread integral with the casing and by means of intermediate members acting upon an axially displaceable driving member radially displacing the hub. At least one compensating body may advantageously be coupled to the hub, said body being radially displaced opposite to the hub by the second axially adjustable device in order to obtain at least a static balance of the hub.

The mechanism according to the invention has the further advantage that the mass of the eccentrically adjustable structural members is restricted to the friction ring so that a reduced inversely alterable compensating mass is required for compensating the changing unbalanced mass. The mechanism according to the invention further provides the possibility of arranging the balancing weights axially at both sides of the friction ring so that not only a static but also a dynamic balance is obtained.

The radial displacement of the hub may, according to one embodiment, be effected by means of hinge links transferring the axial motion of the intermediate members into a radial motion of the hub.

A further embodiment provides wedge surfaces effecting moving connection between the driving member and the hub.

The first adjustment device for changing the distance of the wheel rims is provided on the output side, the second adjustment device for the hub on the input side of the mechanism. The two adjustment devices can be coupled so that the displacement of the wheel rims and the hub is precisely adapted to one another. In a preferred embodiment, a single adjustment device is provided having an adjustment ring movable on a thread integral with the casing, said ring axially acting upon the axially displaceable wheel rims of the two wheels and, further radially acting upon the hub whereby at least one rolling bearing, each, adapted to bear axial load is arranged between the axially displaceable wheel rim of the first wheel integral with the casing and between the axially displaceable wheel rim of the second wheel rotatable with the output shaft and the driving member actuating the hub, and whereby the undisplaceable wheel rim of the second wheel adapted to move with the output shaft is provided with slots parallel to the axis through which parallel extending connecting elements project between the axially displaceable wheel rim of the second wheel and a ring associated with the driving member of the hub.

The mechanism according to the invention may be a friction wheel mechanism with conical friction rims. A preferred embodiment of the invention provides, however, a toothing between the transmission surfaces, said toothing being formed by substantially radially extending grooves, ribs being arranged between said grooves, the grooves and the ribs of the two transmission surfaces of each wheel lying alternately opposite one another, and wherein two rims of axially free toothing elements meshing with the grooves of the transmission surfaces are arranged in the ring, said toothing elements being formed by sets of individually axially free lamellas projecting from the ring by the depth of one groove and thereby meshing with the grooves.

The rims of toothing elements are arranged in the two regions of the ring having conical surfaces, openings of square or rectangular cross-sections being provided therein. The sets of lamellas forming the toothing elements have a trapezoid shape, whereby the angle of inclination of the lamellas corresponds to the one of the conical surfaces.

In order to obtain an impeccable meshing of the toothing elements with the grooves, when moving into the transmission regions as well as when moving out from the transmission regions, a further preferred embodiment provides that the grooves in the transmission surfaces of the first wheel integral with the casing are adapted to diverge towards the axis of the mechanism, and the grooves in the transmission surfaces of the second wheel rotatable with the output shaft are adapted to converge towards the axis of the mechanism.

As during the motion of the toothing elements through the non-meshing regions, particularly at the greatest possible radial displacement of the ring, the wheel rims do possibly not form a lateral stop for the individual axially free lamellas, the invention further provides that each lamella has a trapezoid shape, whereby limiting stops for the axial movement of the lamellas project from the end portions of the long side of the trapezoid.

DESCRIPTION OF THE FIGURES OF THE DRAWING

In the following several embodiments of the invention will be described in greater detail by means of the figures of the drawing without being limited thereto.

DESCRIPTION OF PREFERRED EMBODIMENTS

Figure 1:
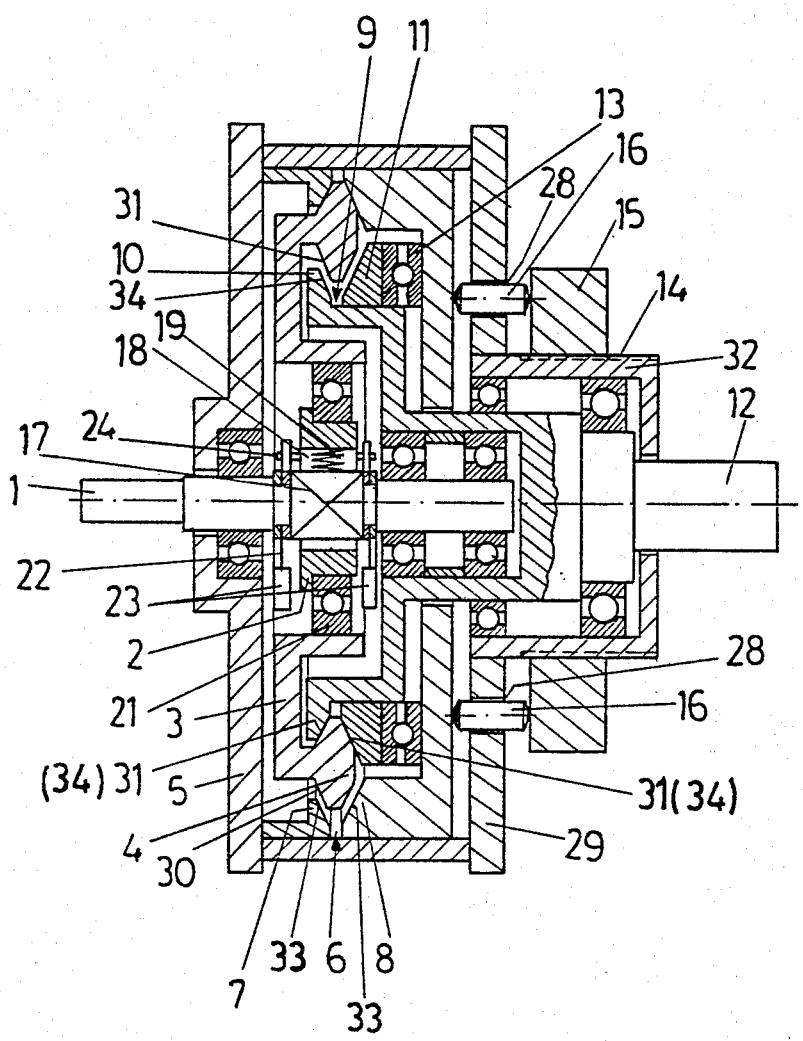
FIG. 1 shows a longitudinal sectional view of a first embodiment of a friction wheel mechanism with a first adjustment device.

The mechanism according to the invention illustrated in FIG. 1 comprises an input shaft 1 and an output shaft 12 coaxial thereto. A hub 2 is rigidly connected with the input shaft 1 but arranged to be eccentrically and, if desired, also axially displaceable. To this end, the input shaft 1 has a square portion 17 in the region of the hub 2. The recess 18 has the same breadth but a greater length than the square portion 17 so that the hub 2 is displaceable in longitudinal direction of the recess 18. The hub 2 is surrounded by a radial rolling bearing 21 on which a cranked disk 3 is rotatably mounted. A ring in the form of a friction ring is laterally fastened to the disk 3, said ring having four conical transmission surfaces 30, 31 and a convex octangular cross-section. The two outwardly directed conical transmission surfaces 30 engage between two wheel rims 7, 8 of a first external wheel 6 rigidly connected with the casing 5, whereby they coact in one region with the transmission surfaces 33 of the wheel rims 7, 8. The two wheel rims 7, 8 are adapted to change their distance between each other, which is effected by axial displacement of one wheel rim 8.

The two other inwardly directed conical transmission surfaces 31 of the ring 4 engage between two wheel rims 10, 11 of a second internal wheel 9 whose distance to each other is also alterable, whereby the transmission surfaces 31 coact with the transmission surfaces 34 of the wheel rims 10, 11 in a region offset by 180°. In the illustrated embodiment, one wheel rim 10 is axially undisplaceable and the second wheel rim 11 is axially free, whereby the axially free second wheel rim 11 is rotatably mounted on a cranked part of the second wheel 9.

The second wheel 9 is unrotatably connected with the output shaft 12. The planes of symmetry of the two wheels 6, 9 as well as of the ring 4 coincide so that tilting moments are almost impossible.

The two axially displaceable wheel rims 8, 11 are adjustable by means of a common first adjustment device, whereby an axial rolling bearing 13 is arranged between the two wheel rims 8, 11, as they turn relatively to each other. The adjustment device has an adjustment ring 15 adapted to move on a thread 14 of an annular extension 32 integral with the casing and surrounding the output shaft 12. The adjustment ring 15 acts upon several intermediate members 16 formed by bolts axially displaceable in bores 28 of the casing side wall 29 and resting against the displaceable wheel rim 8 of the external wheel 6 integral with the casing. A movement of the adjustment ring 15 effects a joint change in the wheel rim distance between the two wheels 6, 9.

Figure 7:
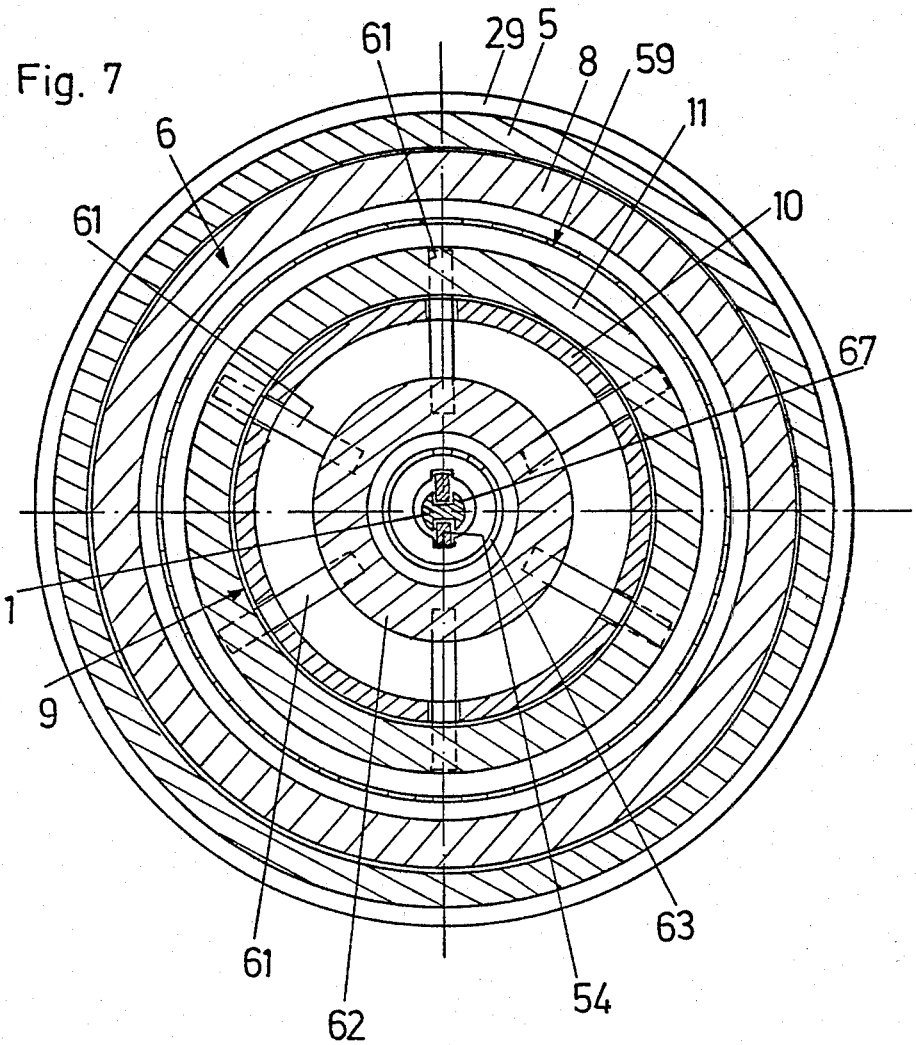
FIG. 7 shows a section along line VII—VII of FIG. 6.

The eccentric arrangement of the ring 4 effects an oscillating motion of the ring 4, when the input shaft 1 is rotated, the external transmission surfaces 30 running on the transmission surfaces 33 on the wheel rims 7, 8 of the external wheel 6. The required contact pressure is obtained by means for increasing the eccentricity, in the embodiment illustrated in FIG. 1 said means being formed by a spring 19 inserted into the recess 18 of the hub 2 and radially abutting the square portion 17 of the input shaft 1. Other parts may be provided instead of the spring 19, e.g. a hydraulically extensible structural member or the like. Further possibilities will be described later on by means of FIGS. 4 and 7. A spring 19 may be used, when transmitting lower torques and in case of constant load as the spring power which increases with increasing compression can by means of a suitable spring be substantially adapted to the torque to be transmitted and increasing with decreasing eccentricity.

The motion of the oscillating ring 4 is simultaneously transmitted onto the second internal wheel 9 in the same direct manner, whereby the transmission surfaces 31 of the ring 4 run on the transmition surfaces 34 of the wheel 9. Hence, no further output members are required, and the mass of the eccentrically moving structural members is restricted to the disk 3 with the ring 4.

By means of the position of the ring 4 illustrated in FIG. 1, a medium reduction ratio is obtained. When its distance from the casing side wall 29 is increased by turning the adjustment ring 15, the distances between the wheel rims 7, 8 and 10, 11 of the two wheels 6, 9 are simultaneously increased. By means of the spring 19, the eccentricity of the hub 2 and the disk 3 and, hence, also of the ring 4 is increased, and the wheel rims 7, 8 and 10, 11, respectively, are moved from each other, whereby the spring 19 simultaneously provides for the required contact pressure onto the external as well as onto the internal wheel. Thereby, slight axial displacement of the ring 4 occurs. The increase in eccentricity entails a decrease in the reduction ratio, which is dependent on the difference in diameter of the external wheel 6 and the ring 4 and inversely proportional to the eccentricity.

When approaching the wheel rims 7, 8 and 10, 11, respectively, by turning the adjustment ring 15, the ring 4 is pressed inwardly against the spring 19 and its eccentricity is reduced. In the extreme, eccentricity is zero so that the hub 2 is exactly centrically arranged on the input shaft 1. In this case, the hub 2 runs freely through the radial rolling bearing 21, and the rotary motion of the hub 2 is not transmitted onto the disk 3. The reduction ratio is infinite in this case.

Figure 2:
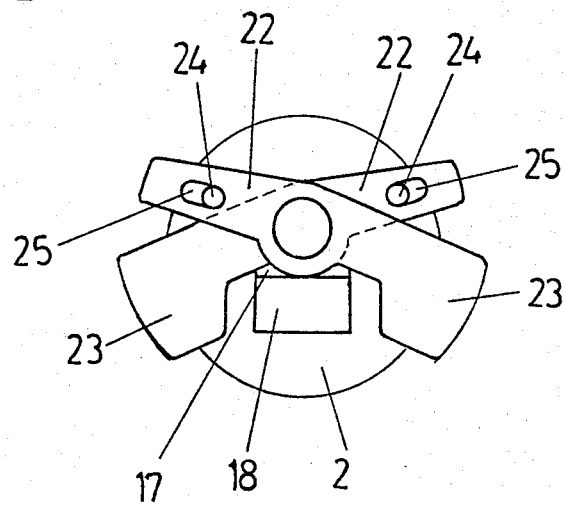
FIG. 2 shows the arrangement and position of the balancing weights, the ring being in centric position.
Figure 3:
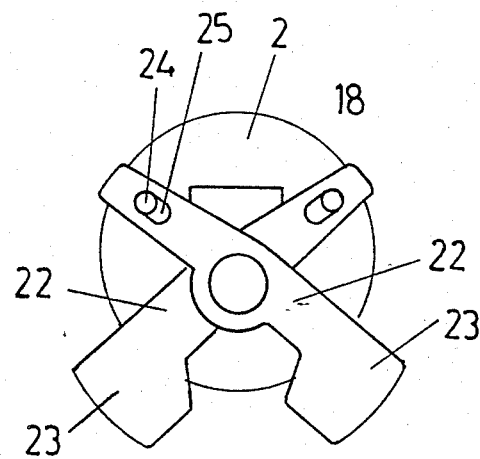
FIG. 3 shows their arrangement and position, when the ring is in eccentric position.

For compensating, the unbalanced mass of the changing eccentricity, oppositely movable compensating bodies 23 are provided. In FIGS. 2 and 3, the arrangement of the compensating bodies is shown in the two limit positions. FIG. 2 shows the position in which the infinite reduction ratio is given, in which there is no unbalanced mass in the hub 2. The compensating bodies 23 are arranged symmetrically to the longitudinal axis of the recess 18 of the hub 2 at intersecting levers 22 having longitudinal holes 25. The levers 22 are pivotally mounted on bolts 24 extending through the longitudinal holes 25 and projecting over the hub in axial direction. A displacement of the hub 2 into the position illustrated in FIG. 3 effects an opposite motion of the two compensating bodies 23 and, hence, a static balancing of the hub. A dynamic balance is obtained by axially arranging the compensating bodies 23 at both sides of the hub.

Figure 4:
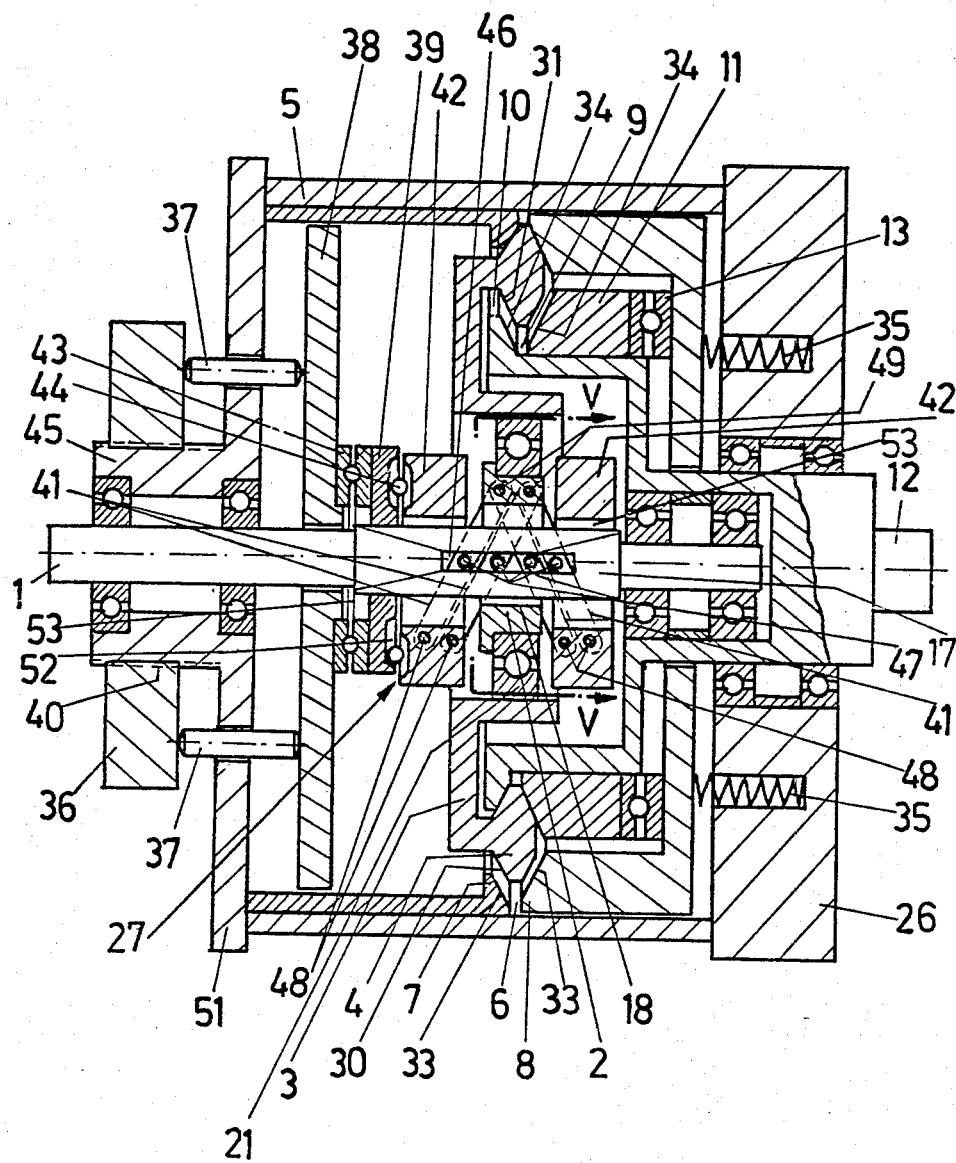
FIG. 4 shows a longitudinal sectional view of a second embodiment of a friction wheel mechanism with a second adjustment device.
Figure 5:
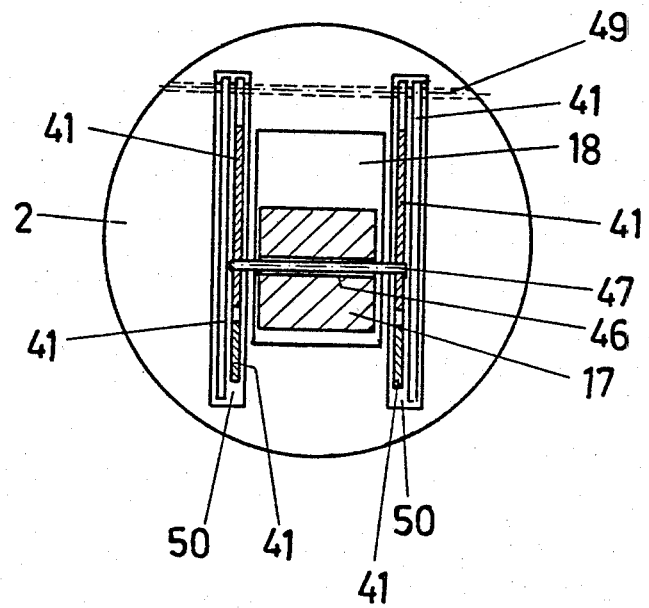
FIG. 5 shows a section along line V—V of FIG. 4.

In the embodiment according to FIG. 4, the radial eccentric adjustment of the hub 2 forcedly in both directions is, on the one hand, illustrated by a separate adjustment device and, on the other hand, the adjustment device shown in FIG. 1 is replaced by readjustment springs 35. The structure of the mechanism and the arrangement of the two concentric wheels 6, 9 and of the radially displaceable ring 4 remaining the same, the adjustment device for the radial adjustment of the hub 2 of the ring 4 is arranged on the side of the casing 5 directed to the input shaft. The casing side wall 51 is in this embodiment provided with a hollow cylindrical extension 45 coaxial to the input shaft 1, said extension having an external thread 40. An adjustment ring 36 is movable on the thread 40 and presses by means of pressing bolts 37, which extend through the casing side wall 51, onto a stationary pressure plate 38. The square portion 17 of the input shaft 1, in contrast to the embodiment of FIG. 1, extends on both sides over the hub 2, whereupon a driving member 27 is arranged in an unrotatable but axially displaceable manner. The driving member 27 is, due to a recess 53, also radially displaceable and forms a first compensating body 42. The recess 53 has the same breadth as the square portion 17 but a greater length. On the part of the square portion 17 directed towards the casing side wall 51, an intermediate plate 39 is further arranged in a unrotatable and axially displaceable manner. Between the stationary pressure plate 38 and the intermediate plate 39 adapted to more with the input shaft, an axial rolling bearing 43 is provided, and between the intermediate plate 39 and the driving member 27 a thrust bearing 44 is inserted. The thrust bearing serves to reduce the friction between the coaxial intermediate plate 39 and the radially free driving member 27 and may, for example, be formed by rollers or balls retained in a cage, which has not been illustrated, said rollers or balls running in grooves 52 extending in the radial direction of displacement. The driving member 27, therefore, serves as compensating body 42 for balancing the hub 2, as it is radially displaceable opposite to the hub. In order to radially transmit onto the hub 2 the pressure exerted on the driving member 27 by the adjustment device, four hinge levers 41 are provided, one pair, each, forming parallel guiding means. For receiving the hinge levers 41, the driving member 27 is provided at both sides of the recess 53. Two hinge axles 48 extend through the driving member 27 parallel to the shorter side of the recess 53 and form the bearings for the hinge links 41 arranged in pairs. Two oppositely arranged hinge levers, each, are connected in the center by means of a guiding bolt 47 mounted in a longitudinal slot 46 of the square portion 17 in an axially displaceable manner. The other ends of the two-arm hinge levers 41 are in the same manner mounted in the hub 2, as can clearly be seen in FIG. 5. The hub 2 also has two slots 50 extending parallel and at both sides of the longer side of the recess 18 into the hub 2. The ends of the two-arm hinge levers 41 are mounted in hinge axles 49 extending parallel to the shorter side of the recess 18 through the hub 2. An axial pressure onto the driving member 27 displaces the guiding bolts 47 in the longitudinal slot 46. As the wheel rims 30, 31 of the ring 4 rest against the wheel rims 33, 34 of the wheel 6, 9, there is no possibility of freely displacing the hub 2 linked to the ring 4 by means of the disk 3. The hinge levers 41 are, therefore, pivoted around the guiding bolts 47, whereby the hub 2, on the one hand, and the driving member 27, on the other hand, are radially displaced but into opposite directions.

In order to obtain a dynamic balance of the hub 2 and of the disk 3 carrying the ring 4, a further equally designed compensating body 42 is preferably arranged on the part of the square portion 17 of the input shaft 1 directed towards the output shaft 12, said compensating body 42 being also linked to the hub 2 by means of hinge levers 41 arranged in pairs. The hinge levers 41 are also guided in the slots 50 and mounted on the hinge axles 49. These hinge levers 41, too, are provided with guiding bolts 47 which are also guided in the longitudinal slot 46 of the square portion 17 in an axially free manner.

This structural design on the second adjustment device is suitable for the embodiment illustrated in FIG. 4 as well as for an embodiment corresponding to FIG. 1. The radial displacement of the hub 2 also effects a radial displacement of the hub because of the conical transmission surfaces 30, 31, 33, 34. When actuating the adjustment device, the compensating body 42 on the side of the output shaft will, hence, remain substantially axially unchanged and will be radially adjusted only. It is also possible, however, that the hub 2 is not axially displaced in respect of the input shaft 1 but that the disk 3 is axially displaced in respect of the hub 2. In this case, the two compensating bodies 42 are alternately axially displaced, when the adjustment device is actuated.

In the embodiment according to FIG. 4, several readjustment springs 35 are prestressed between the casing side wall 29 and the displaceable wheel rim 8 of the external wheel 6 for readjusting the two displaceable wheel rims 8, 11 of the wheels 6, 9.

Figure 6:
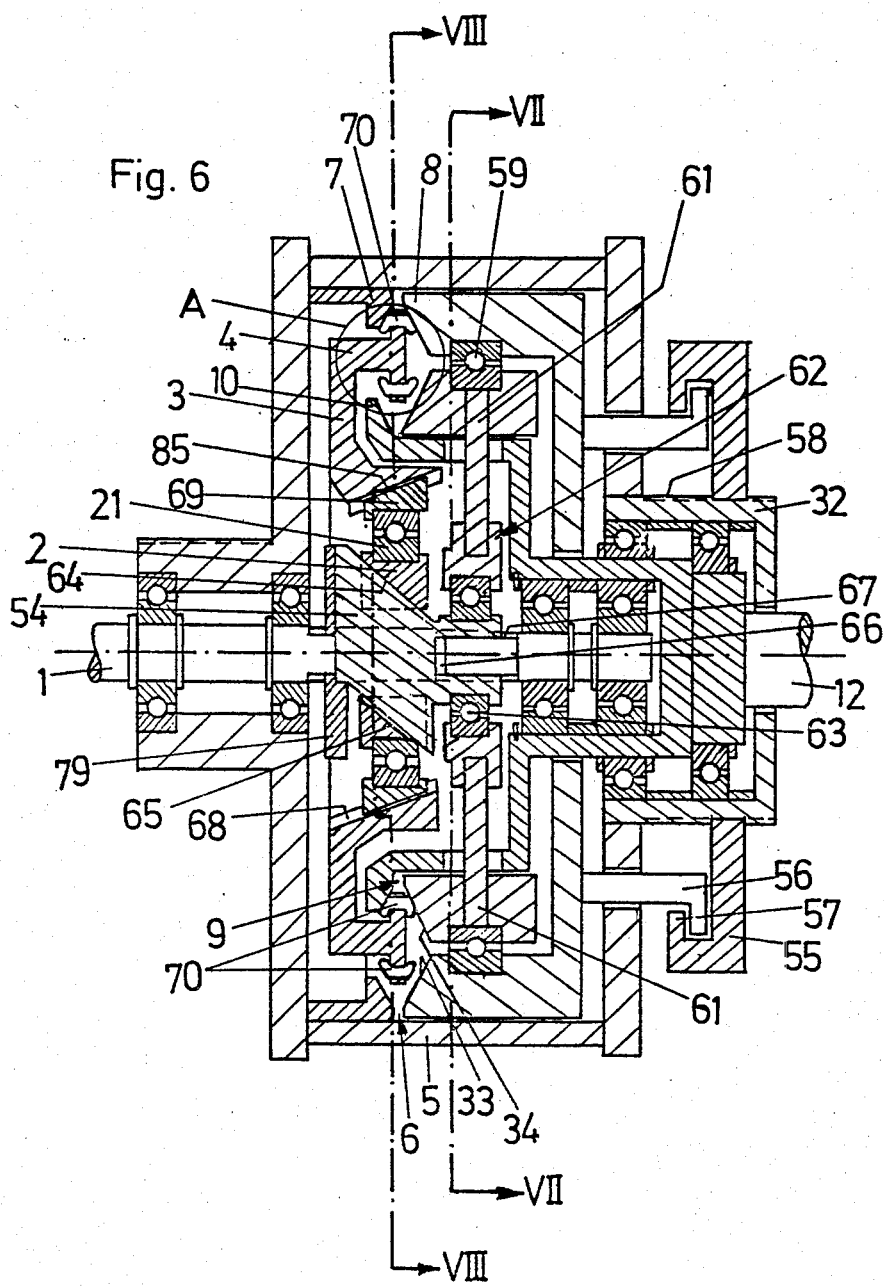
FIG. 6 shows a longitudinal sectional view of a third embodiment with toothing and a combined adjustment device.

In the illustration shown in FIG. 6, the adjustment of the eccentricity of the ring 4 as well as the axial displacement of the wheel rims 8 and 11 of the wheels 6 and 9, respectively, is in both directions forced by a common adjustment device.

Figure 8:
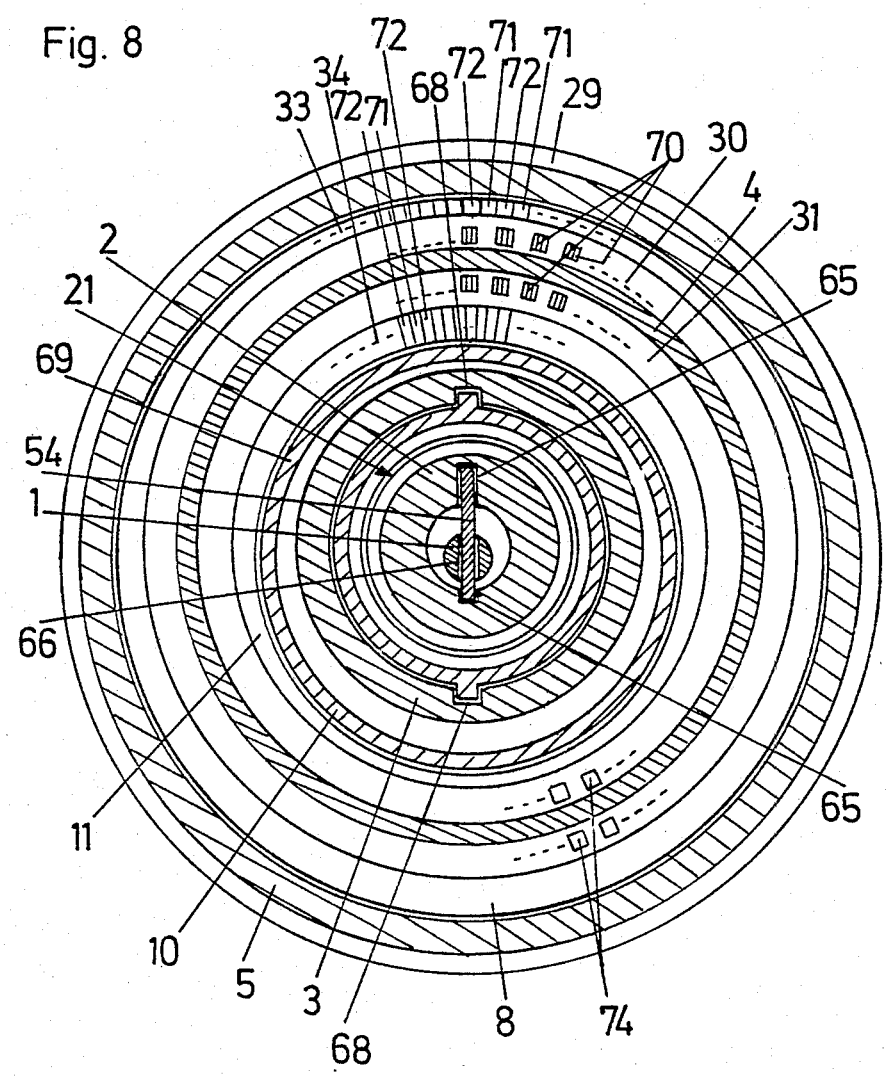
FIG. 8 shows a section along line VIII—VIII of FIG. 6.

The essential parts of the mechanism correspond to the embodiment according to FIG. 1 or 4. On the input shaft 1 a radially displaceable hub 2 is arranged which makes a disk 3 mounted on a radial rolling bearing 21 oscillate, when the input shaft is rotated. The first concentric wheel 6 is linked to the casing 5, said wheel 6 being formed by the stationary wheel rim 7 and the axially free wheel rim 8 having conical transmission surfaces and a toothing, which will be described in greater detail later on. The second concentric wheel 9 is linked to output shaft 12 and is also formed by the stationary wheel rim 10 and the axially free wheel rim 11. Their transmission surfaces 34 are also conical and provided with a toothing. The common adjustment device has an adjustment ring 55 adapted to move on a thread 58 of an axial casing extension 32. A flange 57 of the adjustment ring 55 engages behind hook-shaped intermediate members 56 axially extending through the side wall 29 of the casing and linked to the displaceable wheel rim 8 of the first concentric wheel 6. As can also be seen in FIG. 7, a rolling bearing 59 adapted to bear load in axial direction, e.g. a radial-groove ball bearing, is, first arranged in the displaceable wheel rim 8 of the first wheel 6 and, second, in the displaceable wheel rim 11 of the second wheel 9 adapted to move with the output shaft 12, whereby the two wheel rims 8, 11 are jointly displaceable but individually rotatable. From the wheel rim 11 of the second wheel 9, linking elements 61 extend radially to a ring 62, whereby the linking elements 61 extend through an axially running part of the undisplaceable wheel rim 10 of the second wheel 9 in which corresponding slots 60 are provided. By means of the linking elements 61, an unrotatable but axially displaceable connection between the wheel rims 10 and 11 of the second wheel 9 is obtained. One part of a further rolling bearing 63 adapted to bear axial load, e.g. a radial-groove ball bearing, is associated with the ring 62 surrounding the input shaft 1, the second part thereof being coupled to a flat driving member 54 which is axially displaceable on the input shaft 1 and engages in grooves 67 of the input shaft 1 and is, hence, unrotatably linked thereto. The flat driving member 54, which is preferably a two-part member, also extends through a slot 66 of the input shaft 1 and is on the other end reinforced by a ring 79 linked thereto. Two wedge surfaces parallel to each other are provided on the driving member 54, said wedge surfaces engaging in grooves 65 of the hub 2, the bases of said grooves being corresponding wedge surfaces. FIG. 8 shows a sectional view of a mechanism in this region. When actuating the adjustment device, which effects the axial displacement of the driving member 54, the hub 2 is radially free and transmits its radial motion by means of the rolling bearing 21 onto the disk 3 and its ring 4 whose transmission surfaces 30, 31, which are offset by 180°, run, on the one hand, on the transmission surfaces 33 of the first wheel 6 and, on the other hand, on the transmission surfaces 34 of the second wheel 9. As the transmission surfaces 30, 31, 33, 34 are conical surfaces and the wheel rims 7 and 10 are axially undisplaceable, the coupled axial displacement of the wheel rims 8 and 11 and the radial displacement of the hub 2 simultaneously effects an axial displacement of the ring 4 which is possible because of a ring 69 surrounding the rolling bearing 21, said ring 69 having ribs engaging in grooves 68 of the disk 3 in order to prevent the relative rotary motion between the ring 69 and the disk 3.

In this case, the grooves 68 do not run parallel to the axis but are also inclined towards the input shaft 1 so that the bases of the grooves 68 and the ribs of the ring 69 also form wedge surfaces 85, which are parallel to each other. The angle between two wedge surfaces 64 and 85 corresponds to the angle between the transmission surfaces 33, 34 and the axis of the mechanism.

In the previously described embodiments according to FIG. 1 and 4, the transmission surfaces 30, 31, 33, 34 are friction surfaces so that the mechanisms are conical-disk friction wheel mechanisms.

Figure 9:
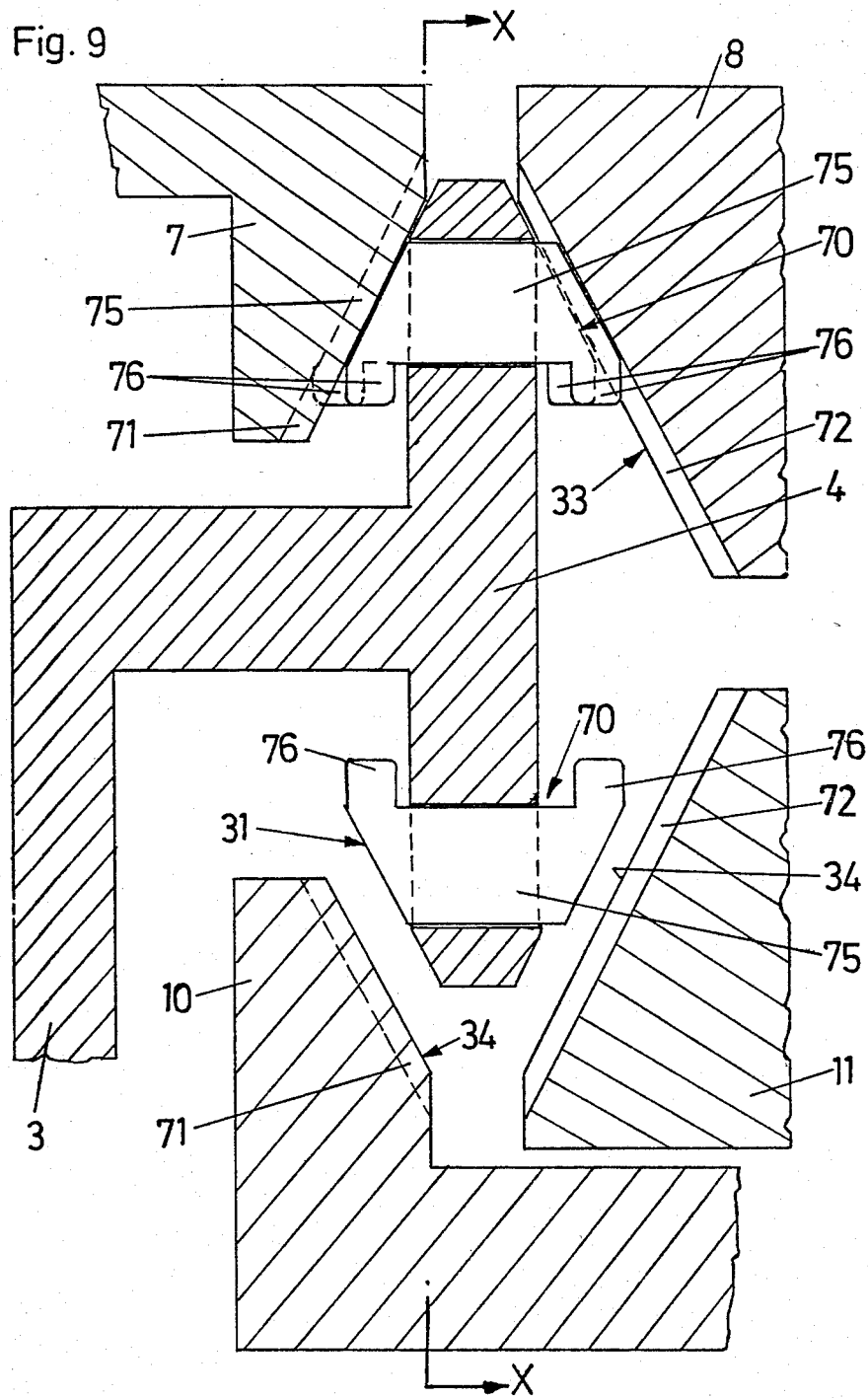
FIG. 9 shows an enlarged view of portion A of FIG. 6.
Figure 10:
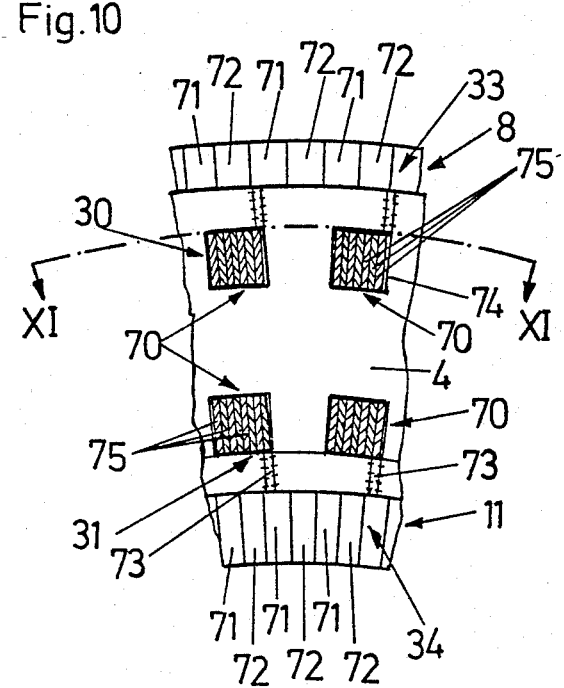
FIG. 10 shows a sectional view of portion A along line X—X of FIG. 9.
Figure 11:
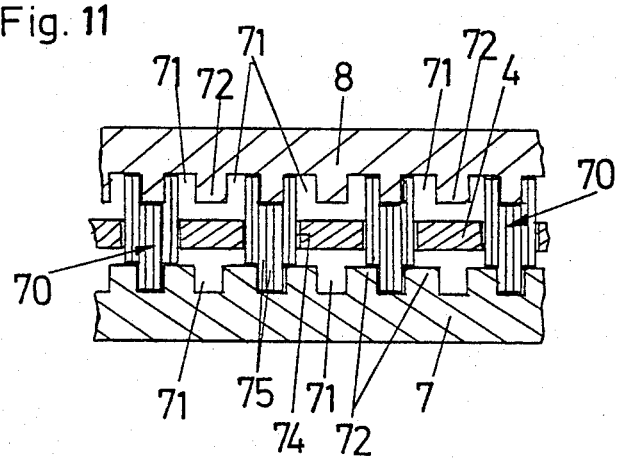
FIG. 11 shows a sectional view along line XI—XI of FIG. 10.

The embodiment according to FIG. 6 is, however, provided with a toothing between the conical transmission surfaces which will be described in greater detail in the following with reference to FIGS. 9–11. In the ring 4, two rims are formed by openings 74 having rectangular or square cross-sections (FIG. 8, 10), a set of individually axially free lamellas 75 being inserted into each of them. The lamellas in FIG. 9 are substantially trapezoid, whereby the side edges form an angle with the base line which corresponds to the angle between the transmission surfaces 33, 34 and the axis of the mechanism. Grooves 71 and ribs 72 running substantially radially therebetween are provided in the transmission surfaces 33, 34. The number of grooves 71 and ribs 72 is of minor importance, it is essential, however, that opposite one rib, each, in one transmission surface 33 and 34, respectively, one groove 71 is formed in the other transmission surface 33 and 34, respectively, of the same wheel 6 and 9, respectively. Each lamella 75 of the external rim of toothing elements 70 either engages in a groove 71 of the axially undisplaceable wheel rim 7 or the axially free wheel rim 8 (FIG. 11) and rests with the opposite side against the upper side of a rib 72 as the breadth of each groove 71 at least corresponds to the breadth of one rib 72, the breadth preferably being slightly greater. This is also true for the lamellas 75 of the internal rim of toothing elements 70 offset by 180° and associated with the grooves 71 and the ribs 72 of the transmission surfaces 34 of the wheel rims 10, 11 of the second wheel 9. All grooves 71 in both transmission surfaces 33, 34 of both wheels 6, 9 may have parallel side walls, but they preferably diverge into the direction of the ring 4 to improve engagement and disengagement of the sets of lamellas in the transmission regions, as the radii 4 of the rims of toothing elements 70 differ from those of the wheel rims 7, 8, 10, 11.

When changing the distance between the wheel rims 7, 8 and 10, 11, the lamellas 75 are displaced in the grooves. To make the same lamellas 75 remain in one groove 71, the radial displacement would, corresponding to the increasing or decreasing breadth of the ribs 72, require an increase or decrease in the distance between the sets of lamellas. As this is not possible, lamellas 75 which are forced out from a groove 71 of a wheel rim move into an oppositely offset groove 71 of the second wheel rim. Thereby, a continuous positive meshing of all toothing elements is obtained in spite of the radial displacement of the ring 4. As the axially free motion of the lamellas 75 is not impaired outside the meshing regions, and as depending on the pitch angle of the transmission surfaces 30, 31, 33, 34 their axial motion is not impaired by said surfaces, the lamellas are in the end portions of their longer sides provided with limiting stops 76 projecting inserting slots 73 are cut from the outer ring surface into the ring 4 into each opening 74, said slots being closed again after the insertion of the lamellas (FIG. 10). This can be done without weakening the mechanism, as the lamellas 75 are exposed to radial stress towards the center of the ring 4, i.e. towards the fastening region of the disk 3.

Figure 12:
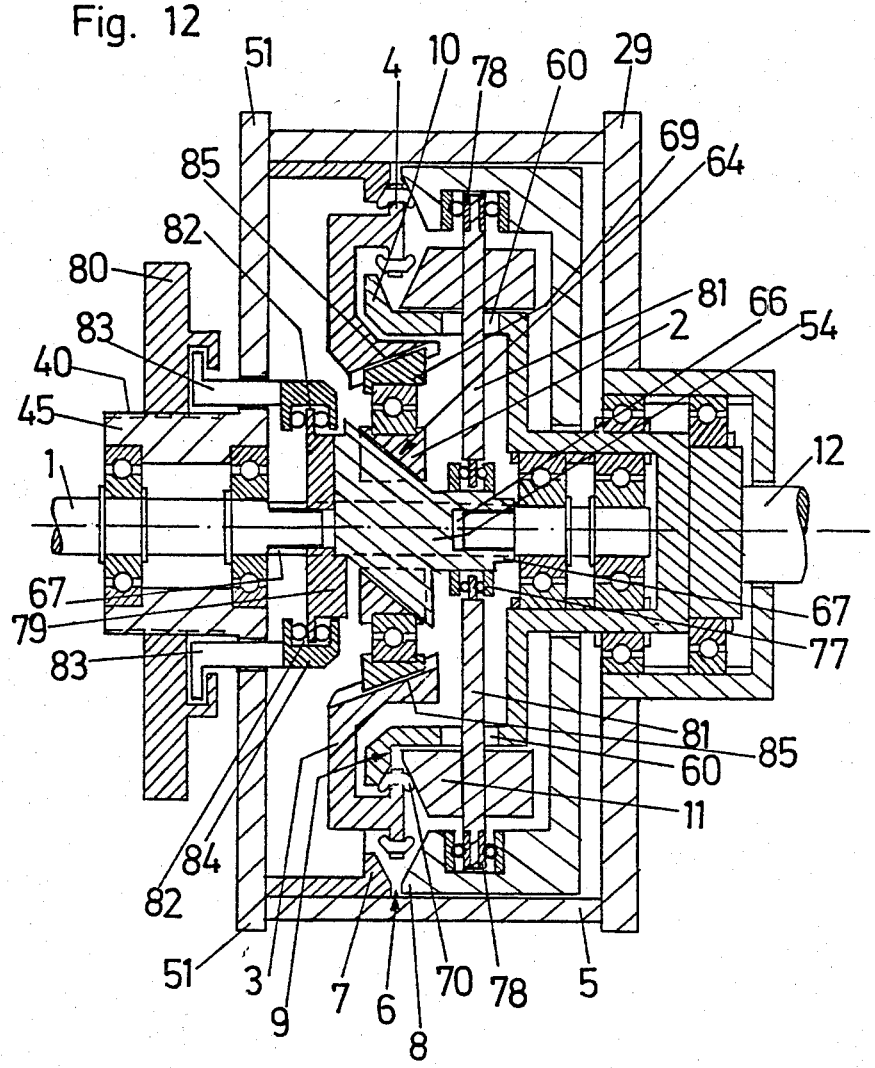
FIG. 12 shows a longitudinal sectional view of a fourth embodiment with a second combined adjustment device.

FIG. 12 shows a further embodiment of a mechanism according to the invention in which a combined adjustment device, also similar to FIG. 4, is arranged on an axial casing extension 45 which is arranged on the side of the input shaft and carries a thread 40. An adjustment ring 80 has again a hook-like flange engaging behind intermediate members 83, and the intermediate members 83 which extend through the casing side wall 51 are fastened to a ring 84 including a second axial thrust bearing 82. A pressure plate 79 which is unrotatably retained in a groove 67 of the input shaft 1 engages in the thrust bearing 82, the driving member 54 extending through a slot 66 of the input shaft 1 and having two parallel wedge surfaces 64 being retained on said pressure plate. On the other side of the driving member 54, a further axial thrust bearing 77 is arranged to which radially projecting linking elements 81 are associated in spoke-like manner. The linking elements 81 extend through slots 60 in the stationary wheel rim 10 of the second wheel 9 as well as through bores in the displaceable wheel rim 11 of the second wheel 9 and terminate in a further axial thrust bearing 78 inserted into the displaceable wheel rim 8 of the first wheel 6 integral with the casing. Actuation of the adjustment ring radially displaces the hub 2 guided on the wedge surfaces 64 and effects a joint axial displacement of the two displaceable wheel rims 10, 11. Otherwise, the structure of the mechanism in respect of arrangement and design of the ring 4 corresponds to the embodiment according to FIG. 6. In this case, too, a toothing between the transmission surfaces 30, 31, 33, 34 has been illustrated but friction surfaces may equally be provided.

The mechanism according to the invention has a continuously adjustable reduction ratio, coaxial input- and output shafts, a particularly space-saving and simple structure, and it is, due to the indirect power transmission by means of the ring 4, also particularly suitable for great torques and irregular loads. The infinite reduction requires no additional clutch and allows particularly smooth handling of the mechanism.

I claim:

1. A mechanism with continuous adjustment for the transmission of a rotary motion between an input shaft and a coaxial output shaft comprising a casing, a first concentric wheel rotatably fixed relative to said casing and having two first wheel rims with first conical transmission surfaces, a second wheel concentrically arranged on said output shaft, said second wheel having two second wheel rims with second conical transmission surfaces, the axial distance between said first wheel rims as well as between said second wheel rims being adjustable, all conical transmission surfaces of said two wheels being provided with a toothing formed by substantially radially extending grooves and by ribs being arranged between said grooves, said grooves and said ribs of said two transmission surfaces of each of said wheels lying alternately opposite one another, and a radially displaceable ring being rotatably mounted on a hub adapted to move with said input shaft and having two arrays of axially free toothing elements meshing with said grooves of said first and said second conical transmission surfaces, said toothing elements being formed by sets of lamellas individually displaceable parallel to the axis and each of said lamellas projecting from said ring by the depth of one of said grooves, the area of contact between one of said arrays and said first wheel rims being offset by 180° from the area of contact between the other of said arrays and said second wheel rims.

2. A mechanism according to claim 1, wherein said grooves in said transmission surfaces of said first wheel integral with the casing are adapted to diverge towards the axis of said mechanism, and said grooves in said transmission surfaces of said second wheel rotatable with said output shaft are adapted to converge towards the axis of said mechanism.

3. A mechanism according to claim 1, wherein each of said lamellas has a trapezoid shape, limiting stops for the axial movement of said lamellas projecting from the end portions of the long side of the trapezoid.

4. A mechanism according to claim 1, wherein one of the first wheel rims, and one of the second wheel rims, is axially undisplaceable, and the other first wheel rim and the other second wheel rim are commonly axially displaceable by means of an adjustment device and have a rolling bearing being arranged between them.

5. A mechanism according to claim 4, wherein the planes of symmetry of said two wheels and of said ring coincide.

6. A mechanism according to claim 1, wherein said hub of said ring is associated with an adjustment device acting by means of a pressure member rotatably mounted on said input shaft upon an axially displaceable driving member radially moving said hub.

7. A mechanism according to claim 6, wherein said axially displaceable driving member radially displaces opposite to said hub at least one compensating body coupled to said hub.

8. A mechanism according to claim 6, wherein wedge surfaces effecting moving connection between said driving member and said hub are provided.

9. A mechanism according to claim 4, wherein said adjustment device axially acts upon said axially displaceable wheel rims of said two wheels, and further acts upon said axially displaceable driving member of said hub.

10. A mechanism according to claim 4, wherein said adjustment device is provided with an adjustment ring movable on a thread integral with said casing and acting upon the axially displaceable part of the mechanism by means of intermediate members extending through a wall of said casing, thereby being displaceable parallel to the axis.

11. A mechanism according to claim 9, wherein moving connection between said axially displaceable driving member of said input shaft and said axially displaceable wheel rims of said two wheels is effected by connecting elements radially extending between said axially displaceable wheel rim of said second wheel rotatable with said output shaft and a ring associated with said driving member and relatively movable thereto, said connecting members extending through slots parallel to the axis and arranged in the undisplaceable wheel rim of said second wheel rotatable with said output shaft.

12. A mechanism according to claim 10 or 11, wherein said adjustment ring acts upon said axially displaceable wheel rim of said wheel integral with said casing by means of said intermediate members extending through the wall of said casing, said axially displaceable wheel rim resting on said axially displaceable wheel rim of said wheel rotatable with said output shaft by means of a rolling bearing, said connecting members radially extending therefrom and said ring associated with said driving member forming the pressure member rotatably mounted on said input shaft.

13. A mechanism according to claim 1 or 6, wherein said ring is arranged on the hub to be axially displaceable.

* * * * *